United States Patent Office 3,272,407
Patented Sept. 13, 1966

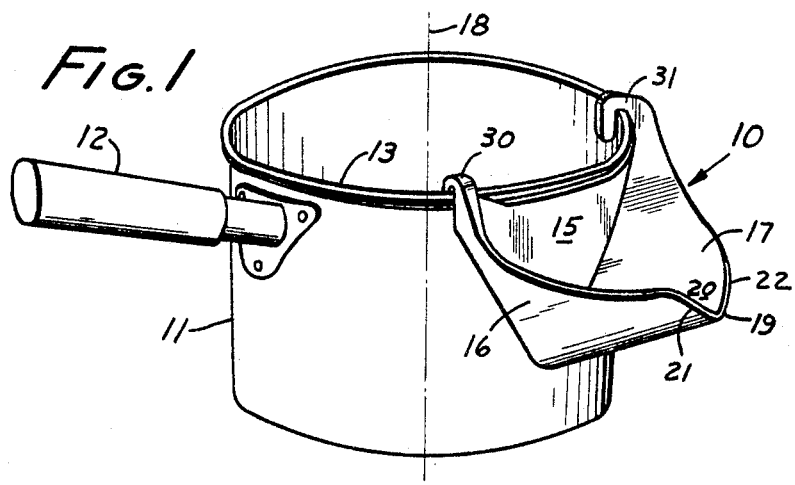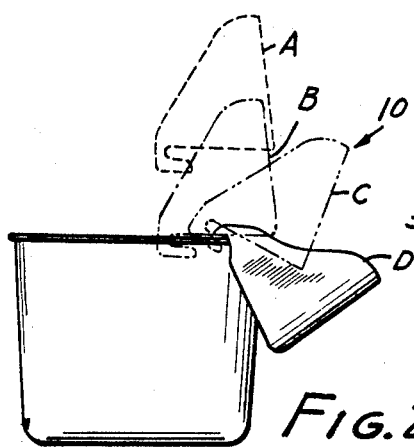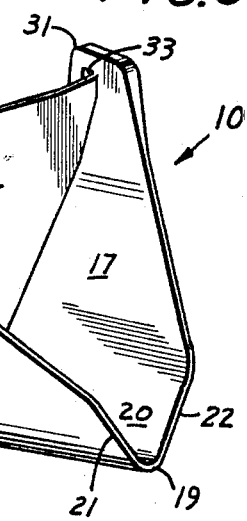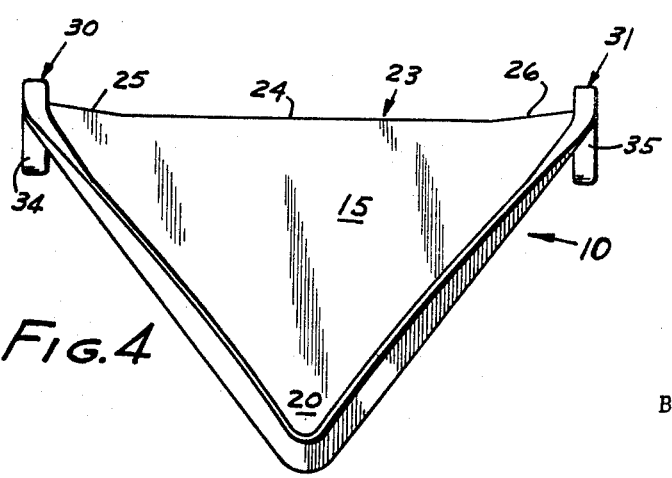

3,272,407
FLEXIBLE SNAP-ON SPOUT FOR CURVED RIM CONTAINERS
Jack B. Ottestad, 1442 Muirlands Drive, La Jolla, Calif.
Filed Aug. 6, 1964, Ser. No. 387,903
3 Claims. (Cl. 222—569)

This invention relates to a spout adapted to be attached to and detached from the curved rim of a container.

Housewives are familiar with the problem of pouring liquids from a generally cylindrical pan which has a curved rim. The tendency of the liquids, particularly when the pan is full, is to spill over a large part of the circumference of the rim. Then when the pouring is stopped, instead of a clean cutting of the fluid, enough of it will adhere to the rim that it will spill down the outside of the pan. It becomes messy enough on the pan, but when it spills onto the stove or onto a hot burner, it is even a worse nuisance.

It is an object of this invention to provide a spout which readily can be attached to the container and be detached therefrom. While in place, this spout engages a significant portion of the circumference of the rim so as to receive the fluid poured therefrom, and it will catch it all. The spout has a backing member which isolates the outside of the pan from the region within the spout so that the fluid does not drop down the side of the pan. Furthermore, the spout may be arranged so that it catches any drops which overflow, and then will confine them to its own structure.

A spout according to this invention is a generally trihedral structure that includes a stiffly flexible backing wall member which has an upper edge and a lower extreme. This backing wall member is stiffly flexible and is intended to stand contiguous to the wall of the container and make a tight fit with the rim thereof. A pair of trough members is provided, these members intersecting the backing wall member and each other. Their intersection with each other extends along an axial plane which plane lies substantially normal to the backing wall member. The bottom of the trough formed by the intersection of the trough members extends away from the backing member and along an incline which rises from its intersection with the backing wall member, and it terminates at an elevation beneath the upper edge of the backing wall member, all of these elevations and directions are in reference to the backing wall member when it is in a substantially vertical position. A pair of hook members is provided on the opposite side of the backing wall member from the trough members, each of said hook members including a binding surface and an elevation-defining surface. The binding surface is spaced from and faces toward the backing wall member beneath the elevation-defining surface, and the elevation-defining surface is no lower than the upper edge of the backing wall member.

According to a preferred but optional feature of the invention, the upper edge includes a central portion which is relatively lower than those portions of the upper edge which are adjacent to the hook members, whereby this central region can snap under the rim of a container when the container has an externally beaded rim.

The above and other features of this invention will be fully understood from the following detailed description and the accompanying drawings in which:

FIG. 1 is a perspective view showing the presently preferred embodiment of the invention attached to a container;

FIG. 2 is a side elevation showing four successive positions occupied by the spout in being attached to the container of FIG. 1;

FIG. 3 is a perspective view showing more details of the spout; and

FIG. 4 is a right-hand elevation of the spout.

FIG. 1 illustrates spout 10 attached to a pan 11. The pan has a handle 12 and a beaded circular (curved) rim 13. Not all containers have a beaded rim, and it is to be understood that this spout is also useful on containers which have curved rims that are not necessarily circular, and which are not necessarily beaded.

The details of the spout are best shown in FIG. 3. The device is a generally trihedral structure which is open at its top. It includes a stiffly flexible backing wall 15 that is adapted to stand substantially upright, and occasionally even vertical, depending on the container shape. A nearly vertical position is shown in FIG. 1. A pair of trough members 16, 17 intersect the backing wall member, and also intersect each other along an axial plane which lies normal to the backing wall member. This plane is one which includes axis 18 of the pan, and goes through a central point 19 of a trough 20 formed by the trough members. The bottom of the trough is preferably gently curved in the sense that sharp corners are avoided at this point, so as to give a broader pouring range than would be available were these members to intersect at a sharp bottom. This arrangement is best shown in FIG. 4. The trough members preferably are cut off at edges 21, 22 so that the end of the trough is relatively blunt and tall as opposed to going to a sharp point.

The upper edge 23 of the spout may extend straight across from its opposite ends, and all of it would in that event make a straight-line contact with the upper edge of the rim of the container. However, for containers which have a beaded rim, it is often desirable to form this edge as shown in FIG. 4. This includes a central region 24 which is essentially a straight-line when the device is unflexed, and which has contiguous to it a pair of bounding regions 25, 26. The bounding regions extend upwardly and away from the central region and intersect the trough members at opposite edges of the structure. Near these intersections, there is provided a pair of hook members 30, 31. Each of these hook members is provided with an elevation-defining surface 32, 33 and a binding surface (sometimes called a "retaining surface") 34, 35, respectively. The elevation of the elevation-defining surfaces is no lower than the upper edge of the backing wall member in order that the edge will fall below the upper edge of the rim, and thereby serve not as a dam but rather as a weir over which fluid can flow from the container.

The binding surfaces 34, 35 are spaced apart from the backing wall member so as to hook over the inside of the container. Because the curvature of the container will flex the backing wall member, and because the material of the backing wall member is stiffly flexible, there will be a spring-back effect between the hook members, the backing wall member, and the container, which will cause the spout tightly to be held to the container rim. When the container has a rim and the lower central region is provided on the upper edge of the backing wall member, there is an additional retaining force inasmuch as this central portion is intended to snap in under the rim.

One means of applying the spout to a container, with or without a rim, is shown in FIG. 2. Four successive positions are labeled A, B, C, D, respectively. When the device is quite stiff, housewives will ordinarily prefer this technique inasmuch as the edge of the container will itself act to deform the flexible backing wall member. From positions A to B, the device is lowered down with the backing wall member horizontal. Then the spout is moved so that the tips of the hook members are against the inside wall of the container (position C) and then the device is pressed down through position D to the position shown in FIG. 1. There is therefore a gradual camming effect on the backing wall member with which the housewife has a considerable leverage. It snaps over center because the binding surfaces are directly opposed to the backing wall member through the rim. Were the bounding regions 25, 26 not provided, the housewife might find it difficult to remove the device because of the snapping of the central region underneath the rim. This is overcome by the sloping bounding regions which tend to cam the outer region outwardly as the device is pivoted in reverse order to that just described for the attachment of the spout.

When the device is provided with a straight-across upper edge, that is without the sloping bounding regions shown in FIG. 4, then the edge will not snap underneath the bead, and the problem does not arise. In that event, the edge would extend straight across from the two opposite ends of the upper edge.

Actually, with enough of a squeeze, the spout will come off whatever the shape of the upper edge.

The device should be stiffly flexible and is best made of a material which is relatively slick so as to permit fluid readily to flow off its surface. Furthermore, the material should be heat-resistant, because it will be applied to devices which have boiling fluids therein. It should then neither char nor demold. A suitable material for this is polypropylene of approximately .060 inch in thickness. Such a construction is generally flexible and readily adapts itself to the deformation caused by the wall of the container.

This invention is not to be limited by the embodiment shown in the drawings and described in the description which is given by way of illustration and not of limitation, but only in accordance with the scope of the appended claims.

I claim:

1. A spout for a container adapted to be attached to and detached from a curved rim thereof, said spout comprising: a generally trihedral structure including a stiffly flexible backing wall member having an upper edge and a lower extreme; a pair of trough members, said trough members intersecting the backing wall member, and intersecting each other along an axial plane which lies normal to the backing wall member, the three members forming an open-topped structure, the trough members intersecting to form a trough bottom which extends away from the backing member along an incline which rises from its intersection with the backing wall member and terminates at an elevation beneath the upper edge; a pair of hook members on the opposite side of the backing wall member from the trough members, each of said hook members including a binding surface and an elevation-defining surface, the binding surface being spaced from and facing toward the backing wall member beneath the elevation-defining surface, the elevation-defining surfaces being no lower than the upper edge of the backing wall member, the hook members being integral with the structure and forming therewith a continuous body, the hook members having an inner surface continuous with the inside surface of its respective trough member, which inner surfaces and inside surfaces rise to elevations substantially above the elevation-defining surfaces in order to create a channel extending beyond both sides of, and above, the backing wall member to prevent fluids from leaking or spilling along the rim when the spout is attached to a rim and the rim is tilted.

2. A spout for a container, which spout is adapted to be attached to and detached from a curved rim of the container, said spout having a pouring axis adapted to extend radially beyond the rim, and comprising: a generally trihedral structure including a stiffly flexible backing wall member adapted to bend and conform to the outside of the container adjacent to the rim, said backing wall member having an upper and a lower edge; a pair of trough members, said trough members intersecting the backing wall member adjacent to the lower edge thereof, and intersecting each other to form a trough which extends axially away from the backing wall member along said axis, the three members forming a continuous open-topped structure, the bottom of the trough extending away from the backing member along an incline which rises from the backing wall member at a location adjacent to the lower edge thereof, and which terminates at an elevation between the said edges when the backing wall member is held vertically; a pair of hook members on the opposite side of the backing wall member from the trough members, each of said hook members including a retaining surface and an elevation-defining surface, the retaining surface being spaced from and facing toward the backing wall member beneath the elevation-defining surface, the elevation-defining surfaces occupying an elevation no lower than that of at least the central point of the upper edge when the backing wall is held vertically, whereby the spout may be attached to the rim by hooking the hook members over the rim with the backing wall member lying contiguous to the outside of the container, springback force in the backing wall member holding the hook members firmly engaged to the rim, the hook members being integral with the structure and forming therewith a continuous body, the hook members having an inner surface continuous with the inside surface of its respective trough member, which inner surfaces and inside surfaces rise to elevations substantially above the elevation-defining surfaces in order to create a channel extending beyond both sides of, and above, the backing wall member to prevent fluids from leaking or spilling along the rim when the spout is attached to a rim and the rim is titled.

3. A spout for a container, which spout is adapted to be attached to and detached from a curved rim of the container, said spout having a pouring axis adapted to lie on an extension of the radius of the rim, and comprising: a generally trihedral structure including a stiffly flexible backing wall member adapted to bend and conform to the outside of the container adjacent to the rim, said backing wall member having an upper and a lower edge; a central region and a pair of bounding regions rising from the central region on the upper edge; a pair of trough members, said trough members intersecting the backing wall member adjacent to the lower edge thereof, and intersecting each other to form a trough which extends axially away from the backing wall member along said axis, the three members forming a continuous open-topped structure, the bottom of the trough extending away from the backing member along an incline which rises from the backing wall member at a location adjacent to the lower edge thereof, and which terminates at an elevation between the said edges when the backing wall member is held vertically; a pair of hook members on the opposite side of the backing wall member from the trough members, each of said hook members including a retaining surface and an elevation-defining surface, the retaining surface being spaced from and facing toward the backing wall member beneath the elevation-defining surface, the elevation-defining surfaces occupying an elevation above that of at least the central region of the upper edge when the backing wall is held vertically, whereby the spout may be attached to the rim by hooking the hook members onto the inside of the rim with the backing wall member overhanging and extending outwardly of the outer wall of the container, and then, with the hook members held against the inside wall of the rim, moving the backing wall member toward a vertical position and the elevation-defining surfaces toward the top of the rim, the rim serving to cam the backing wall member into the trihedral structure to conform to the outer wall of the container, the center point of the upper edge moving under the lip of the rim, and the springback force of the bent backing wall member holding the hook members firmly engaged to the rim, the hook members being integral with the structure and forming therewith a continuous body, the hook members having an inner surface continuous with the inside surface of its respective trough member, which inner surfaces and inside surfaces rise to elevations substantially above the elevation-defining surfaces in order to create a channel extending beyond both sides of, and above, the backing wall member to prevent fluids from leaking or spilling along the rim when the spout is attached to a rim and the rim is tilted.

References Cited by the Examiner

UNITED STATES PATENTS 2,783,924   3/1957   Hayes _____ 229—569

FOREIGN PATENTS 26,001      10/1906  Austria.
64,133      11/1945  Denmark.
1,052,038   1/1954   France.

M. HENSON WOOD, JR., *Primary Examiner.*

LOUIS J. DEMBO, *Examiner.*

A. N. KNOWLES, *Assistant Examiner.*